US012601263B1

(12) United States Patent　　　　(10) Patent No.:　　US 12,601,263 B1

Richardson et al.　　　　　　　　　(45) Date of Patent:　　Apr. 14, 2026

(54) RADIALLY CAPTURED IN SITU BALANCING MASSES FOR AIRCRAFT POWERPLANT

(71) Applicant: Pratt & Whitney Canada Corp., Longueuil (CA)

(72) Inventors: Tyler Richardson, Toronto (CA); Nathan Tomes, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/960,302

(22) Filed: Nov. 26, 2024

(51) Int. Cl.
　　*F01D 5/02*　　　(2006.01)
　　*G01M 1/36*　　　(2006.01)

(52) U.S. Cl.
　　CPC ........ *F01D 5/027* (2013.01); *F05D 2220/323* (2013.01); *F05D 2260/15* (2013.01); *G01M 1/36* (2013.01)

(58) Field of Classification Search
　　CPC ......... F01D 5/027; F04D 29/662; F16F 15/32
　　See application file for complete search history.

(56) References Cited

U.S. PATENT DOCUMENTS

| 7,371,042 B2 * | 5/2008 | Lee | F01D 5/027 |
| | | | 416/500 |
| 10,697,300 B2 * | 6/2020 | Rosborough | F01D 5/027 |

| 10,954,793 B2 * | 3/2021 | Korn | F04D 29/662 |
| 11,448,081 B2 * | 9/2022 | Dyer | F01D 11/003 |
| 11,732,585 B2 | 8/2023 | Hagan | |
| 12,018,579 B1 | 6/2024 | Humes | |
| 2005/0265846 A1 * | 12/2005 | Przytulski | F01D 5/027 |
| | | | 416/144 |

FOREIGN PATENT DOCUMENTS

FR　　　　　2630496 B1　　5/1993

* cited by examiner

*Primary Examiner* — Christopher R Legendre
(74) *Attorney, Agent, or Firm* — Getz Balich LLC

(57)　　　　　ABSTRACT

A rotating structure for an aircraft powerplant includes a balancing device and a bladed rotor. The balancing device is configured to rotationally balance the rotating structure about a rotational axis. The balancing device includes a housing and a plurality of balancing masses. The housing includes a first sidewall, a second sidewall, an outer endwall, an annular channel and an annular slot. The outer endwall circumscribes the annular channel. The annular channel extends axially within the housing between the first sidewall and the second sidewall. The annular slot extends radially through the outer endwall to the annular channel. Each of the balancing masses includes a mass body and an engagement feature. The mass body is captured within the annular channel. The engagement feature is configured to be engaged by a tool from outside of the housing to adjust a circumferential position of the mass body about the rotational axis.

20 Claims, 12 Drawing Sheets

600

Assemble powerplant rotating
structure outside of aircraft powerplant
602

Assemble the powerplant rotating
structure into the aircraft powerplant
604

Rotationally balance the powerplant rotating
structure within the aircraft powerplant
606

RADIALLY CAPTURED IN SITU BALANCING MASSES FOR AIRCRAFT POWERPLANT

TECHNICAL FIELD

This disclosure relates generally to an aircraft powerplant and, more particularly, to systems and methods for rotationally balancing a rotating structure of the aircraft powerplant.

BACKGROUND INFORMATION

Various systems and methods are known in the art for rotationally balancing a rotating structure of an aircraft powerplant such as a gas turbine engine. While these known balancing systems and methods have various benefits, there is still room in the art for improvement.

SUMMARY

According to an aspect of the present disclosure, an apparatus is provided for an aircraft powerplant. This apparatus includes a rotating structure. The rotating structure includes a balancing device and a bladed rotor. The balancing device is configured to rotationally balance the rotating structure about a rotational axis. The balancing device includes a housing and a plurality of balancing masses. The housing includes a first sidewall, a second sidewall, an outer endwall, an annular channel and an annular slot. The first sidewall and the second sidewall each project radially out away from the rotational axis to the outer endwall. The outer endwall circumscribes the annular channel. The annular channel extends axially within the housing between the first sidewall and the second sidewall. The annular slot extends radially through the outer endwall to the annular channel. Each of the balancing masses includes a mass body and an engagement feature. The mass body is captured within the annular channel. The engagement feature is axially aligned with the annular slot. The engagement feature is configured to be engaged by a tool from outside of the housing to adjust a circumferential position of the mass body about the rotational axis.

According to another aspect of the present disclosure, another apparatus is provided for an aircraft powerplant. This apparatus includes a rotating structure. The rotating structure includes a balancing device and a bladed rotor. The balancing device is configured to rotationally balance the rotating structure about a rotational axis. The balancing device includes a housing and a plurality of balancing masses. The housing includes a first sidewall, a second sidewall, an outer endwall, a mount, an annular channel and an annular slot. The first sidewall and the second sidewall each project radially out away from the rotational axis to the outer endwall. The outer endwall circumscribes the mount. The mount includes a plurality of mounting apertures arranged circumferentially about the rotational axis. The annular channel extends axially within the housing between the first sidewall and the second sidewall. The annular channel extends radially within the housing between the outer endwall and the mount. The annular slot extends radially through the outer endwall to the annular channel. Each of the balancing masses includes a mass body, an engagement feature and a shank. The mass body is captured within the annular channel. The engagement feature is axially aligned with the annular slot. The shank is threaded into a respective one of the mounting apertures.

According to still another aspect of the present disclosure, another apparatus is provided for an aircraft powerplant. This apparatus includes a rotating structure. The rotating structure includes a balancing device and a bladed rotor. The balancing device is configured to rotationally balance the rotating structure about a rotational axis. The balancing device includes a housing and a plurality of balancing masses. The housing includes a first sidewall, a second sidewall, an outer endwall, a bushing, an annular channel and an annular slot. The first sidewall and the second sidewall each project radially out away from the rotational axis to the outer endwall. The outer endwall circumscribes the bushing. The annular channel extends axially within the housing between the first sidewall and the second sidewall. The annular channel extends radially within the housing between the outer endwall and the bushing. The annular slot extends radially through the outer endwall to the annular channel. Each of the balancing masses includes a lug, a spring element and a pin with a shoulder. The lug is disposed within the annular channel and is circumferentially slidable along the bushing. The spring element is compressed between the lug and the shoulder.

The mass body has an axial width that may be larger than an axial width of the annular slot.

The engagement feature of a first of the balancing masses may include a protrusion that projects radially from the mass body to an outer protrusion distal end. The protrusion may be axially aligned with the annular slot. An axial width of the protrusion may be less than the axial width of the annular slot.

The engagement feature of a first of the balancing masses may include a protrusion that projects radially from the mass body, into or through the annular slot, to an outer protrusion distal end.

The engagement feature of a first of the balancing masses may include a wrenching feature.

The housing may also include a mount radially inboard of the annular channel. The mount may include a plurality of mounting apertures arranged circumferentially about the rotational axis. Each of the balancing masses may also include a shank threaded into a respective one of the mounting apertures.

The shank of each of the balancing masses may be configured to be rotated by the tool to thread into or out of a select one of the mounting apertures when rotationally balancing the rotating structure about the rotational axis.

A radial distance from the mount to the outer endwall may be greater than a sum of a radial height of the shank and a radial thickness of the mass body.

A radial distance from the mount to the outer endwall may be greater than a sum of a radial height of the engagement feature and a radial thickness of the mass body.

The mounting apertures may be equispaced circumferentially about the rotational axis.

The mount may be axially clamped between the first sidewall and the second sidewall.

A quantity of the mounting apertures may be greater than a quantity of the balancing masses.

The mass body may include a lug disposed and circumferentially slidable within the annular channel. The engagement feature may include a pin with a shoulder. Each of the balancing masses may also include a spring element compressed between the lug and the shoulder.

The outer endwall may be configured with a plurality of detents arranged circumferentially about the rotational axis. At least a portion of the shoulder may be configured to mate with a respective one or more of the detents to fix a position of the lug within the annular channel.

The detents may be equispaced circumferentially about the rotational axis.

The housing may also include a bushing radially inboard of the annular channel and axially clamped between the first sidewall and the second sidewall. The bushing may be radially engaged by the lug of each of the balancing masses.

Each of the balancing masses may have a common weight.

The rotating structure may also include a shaft and a plurality of components. The housing and the components may be axially clamped in a common axial stack to attach the housing and the components to the shaft.

The apparatus may also include a compressor section, a combustor section, a turbine section and a flowpath extending through the compressor section, the combustor section and the turbine section. The bladed rotor may be disposed in the turbine section or the compressor section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
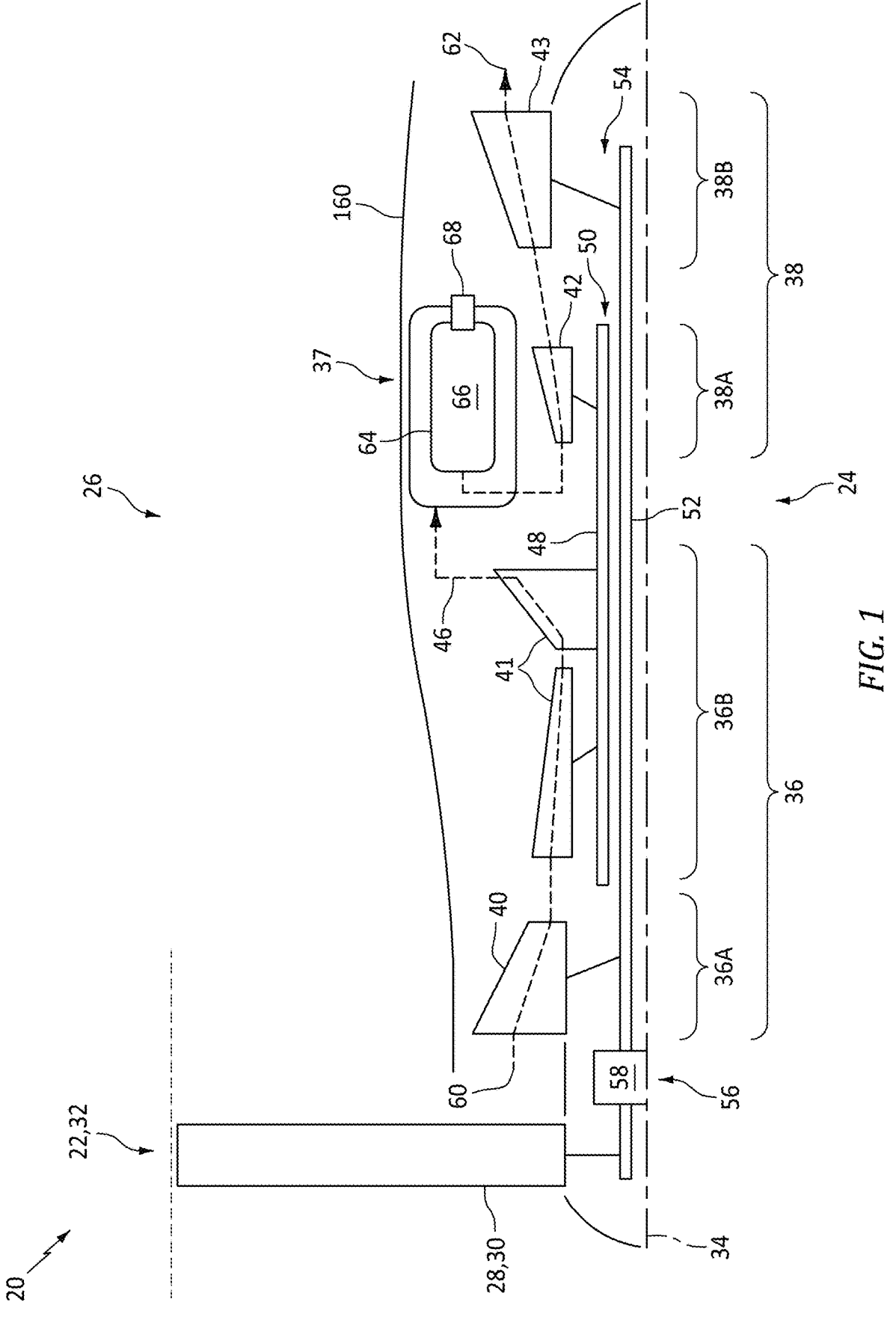
FIG. 1 is a partial schematic sectional illustration of an aircraft powerplant.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. The aircraft powerplant 20 may be configured as, or otherwise included as part of, a propulsion system for the aircraft. The aircraft powerplant 20 may also or alternatively be configured as, or otherwise included as part of, an electrical power system for the aircraft. The aircraft powerplant 20 of FIG. 1 includes a mechanical load 22 and a core 24 of a gas turbine engine 26, where the engine core 24 (e.g., a gas generator) is configured to power operation of the mechanical load 22.

The mechanical load 22 may be configured as or otherwise include a rotor 28 mechanically driven by the engine core 24. This driven rotor 28 may be a bladed propulsor rotor 30 for the aircraft propulsion system. The propulsor rotor 30 may be a ducted propulsor rotor, an open propulsor rotor (e.g., an un-ducted propulsor rotor) or any other type of air moving rotor. For example, where the gas turbine engine 26 is a turbofan engine, the ducted propulsor rotor may be a fan rotor. Where the gas turbine engine 26 is a turboprop engine, the open propulsor rotor may be a propeller rotor. Where the gas turbine engine 26 is a turboshaft engine, the open propulsor rotor may be a rotorcraft rotor such as a helicopter main rotor or a helicopter tail rotor. Alternatively, the driven rotor 28 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary gas turbine engines. The gas turbine engine 26, for example, may alternatively be configured as a turbojet engine, a propfan engine, a pusher fan engine or any other type of gas turbine engine operable to power the operation of the mechanical load 22. However, for ease of description, the mechanical load 22 is described below as a propulsor section 32 of the gas turbine engine 26, and the driven rotor 28 is described below as the propulsor rotor 30 within the propulsor section 32.

The gas turbine engine 26 extends axially along an axis 34 from a forward, upstream end of the gas turbine engine 26 to an aft, downstream end of the gas turbine engine 26. Briefly, this powerplant axis 34 may be a centerline axis of the gas turbine engine 26 and/or its members. The powerplant axis 34 may also be a rotational axis of one or more members of the gas turbine engine 26. The gas turbine engine 26 of FIG. 1 includes the propulsor section 32, a compressor section 36, a combustor section 37 and a turbine section 38. The compressor section 36 of FIG. 1 includes a low pressure compressor (LPC) section 36A and a high pressure compressor (HPC) section 36B. The turbine section 38 of FIG. 1 includes a high pressure turbine (HPT) section 38A and a low pressure turbine (LPT) section 38B.

The LPC section 36A includes a low pressure compressor (LPC) rotor 40. The HPC section 36B includes a high pressure compressor (HPC) rotor 41. The HPT section 38A includes a high pressure turbine (HPT) rotor 42. The LPT section 38B includes a low pressure turbine (LPT) rotor 43. The LPC rotor 40, the HPC rotor 41, the HPT rotor 42 and the LPT rotor 43 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages longitudinally along an (e.g., annular) internal flowpath 46 of the gas turbine engine 26 and its engine core 24. Each of the rotor blades is connected to the respective rotor base. Each of the rotor blades projects radially (e.g., spanwise) out from respective rotor base into the engine flowpath 46 and to a distal tip of the respective rotor blade.

The HPC rotor 41 is coupled to and rotatable with the HPT rotor 42. The HPC rotor 41 of FIG. 1, for example, is connected to the HPT rotor 42 by a high speed shaft 48. At least (or only) the HPC rotor 41, the HPT rotor 42 and the high speed shaft 48 collectively form a high speed rotating structure 50; e.g., a high speed spool of the engine core 24. This high speed rotating structure 50 may be rotatable about the powerplant axis 34.

The LPC rotor 40 is coupled to and rotatable with the LPT rotor 43. The LPC rotor 40 of FIG. 1, for example, is connected to the LPT rotor 43 by a low speed shaft 52. At least (or only) the LPC rotor 40, the LPT rotor 43 and the low speed shaft 52 collectively form a low speed rotating structure 54; e.g., a low speed spool of the engine core 24. This low speed rotating structure 54 is further coupled to the propulsor rotor 30—the driven rotor 28—through a drivetrain 56. This drivetrain 56 may be configured as a geared drivetrain, where a geartrain 58 (e.g., a transmission, a speed change device, an epicyclic geartrain, etc.) is disposed between and operatively couples the propulsor rotor 30 to the low speed rotating structure 54 and its LPT rotor 43. With this arrangement, the propulsor rotor 30 may rotate at a different (e.g., slower) rotational speed than the low speed rotating structure 54 and its LPT rotor 43. However, the drivetrain 56 may alternatively be configured as a direct-drive drivetrain, where the geartrain 58 is omitted. With such an arrangement, the propulsor rotor 30 rotates at a common (the same) rotational speed as the low speed rotating structure 54 and its LPT rotor 43. This low speed rotating structure 54 and/or the propulsor rotor 30 may be rotatable about the powerplant axis 34. Alternatively, the propulsor rotor 30 may be offset from the engine core 24 such that the propulsor rotor 30 rotates about an axis which is (e.g., laterally and/or axially) offset from the powerplant axis 34.

The engine flowpath 46 (e.g., a core flowpath) extends longitudinally within the gas turbine engine 26 and its engine core 24 from an airflow inlet 60 into the engine flowpath 46 to a combustion products exhaust 62 from the engine flowpath 46. The engine flowpath 46 of FIG. 1, for example, extends sequentially longitudinally through the LPC section 36A, the HPC section 36B, the combustor section 37, the HPT section 38A and the LPT section 38B, from the flowpath inlet 60 to the flowpath exhaust 62. With this arrangement, the engine flowpath 46 extends sequentially longitudinally across the LPC rotor 40, the HPC rotor 41, a (e.g., annular) combustor 64 within the combustor section 37, the HPT rotor 42 and the LPT rotor 43 between the flowpath inlet 60 and the flowpath exhaust 62.

During operation of the aircraft powerplant 20 and its gas turbine engine 26, ambient air may be directed across the propulsor rotor 30 (e.g., the fan rotor, the propeller rotor, etc.) and into the engine core 24 through the flowpath inlet 60. This air entering the engine flowpath 46 may be referred to as "core air". The core air is compressed by the LPC rotor 40 and the HPC rotor 41 and directed into a (e.g., annular) combustion chamber 66 within the combustor 64. Fuel is introduced into the engine flowpath 46 by one or more fuel injectors 68. This fuel is mixed with the compressed core air to provide a fuel-air mixture. The fuel-air mixture is ignited and combustion products thereof flow through and sequentially drive rotation of the HPT rotor 42 and the LPT rotor 43. The rotation of the HPT rotor 42 and the LPT rotor 43 respectively drive rotation of the LPC rotor 40 and the HPC rotor 41 and, thus, the compression of the air received from the flowpath inlet 60. The rotation of the LPT rotor 43 drives rotation of the propulsor rotor 30—the driven rotor 28. The rotation of the propulsor rotor 30 propels some of the air flow thereacross (e.g., the air not entering the engine core 24) outside of the engine core 24 to provide engine thrust. Of course, where the driven rotor 28 is alternatively configured as the generator rotor, the rotation of this generator rotor may facilitate generation of electricity.

While the aircraft powerplant 20 and its gas turbine engine 26 are described above with a particular two rotating structure arrangement, the present disclosure is not limited thereto. For example, the LPC rotor 40 may be omitted to configure the LPT rotor 43 as a power turbine (PT) rotor. In another example, the aircraft powerplant 20 and its gas turbine engine 26 may also include another rotating structure; e.g., an intermediate speed spool of the engine core 24. In still another example, the high speed rotating structure 50 may be omitted to provide the gas turbine engine 26 with a single rotating structure arrangement.

Figure 2:
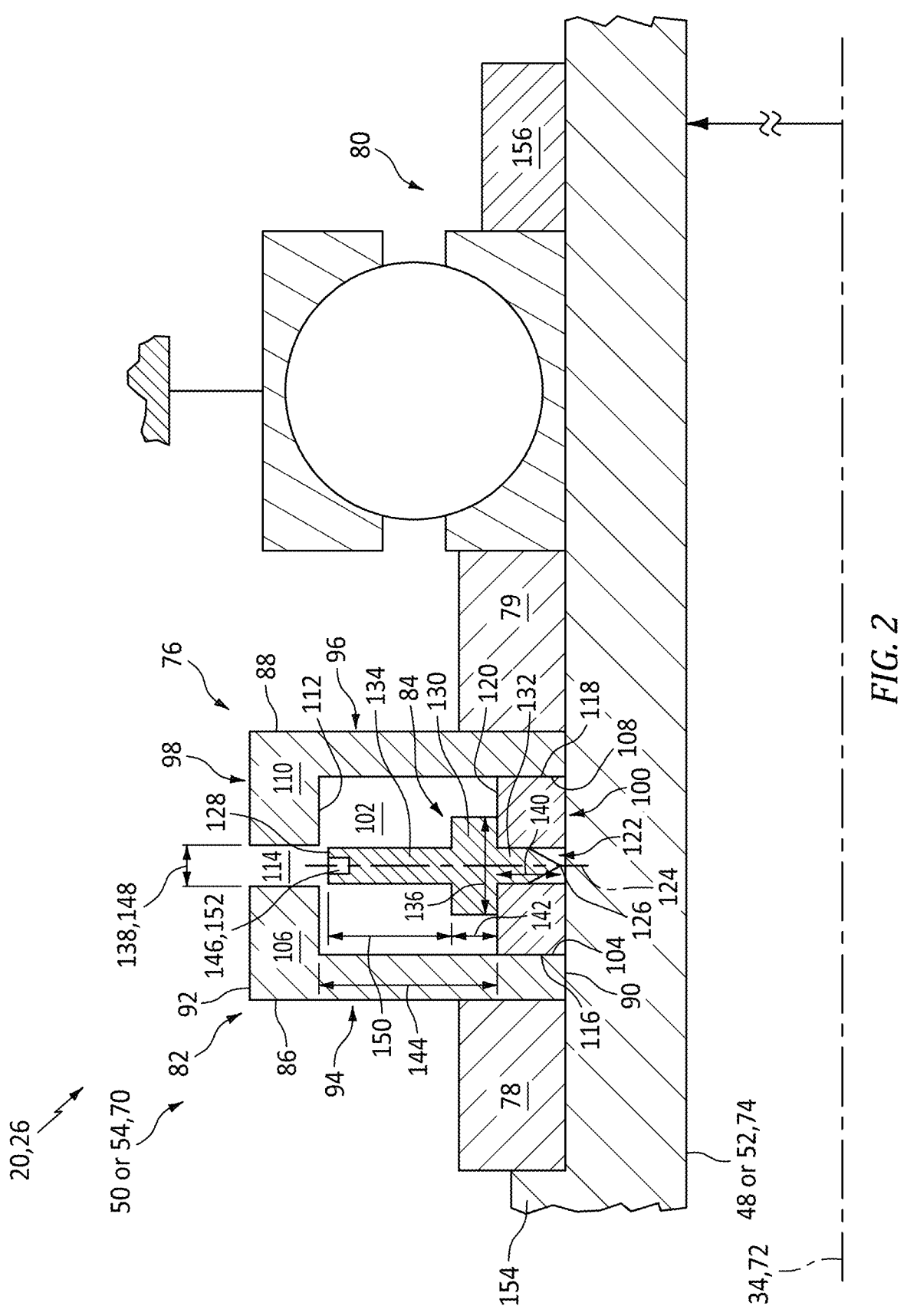
FIG. 2 is a partial sectional illustration of a powerplant rotating structure.

FIG. 2 illustrates a portion of a powerplant rotating structure 70 along an axis 72 such as the powerplant axis 34 (or another rotational axis). This powerplant rotating structure 70 may be configured as the high speed rotating structure 50, the low speed rotating structure 54 or another rotating structure within the aircraft powerplant 20 and its gas turbine engine 26. The powerplant rotating structure 70 is rotatable about the structure axis 72. The powerplant rotating structure 70 of FIG. 2 includes a powerplant shaft 74 (e.g., the high speed shaft 48, the low speed shaft 52, etc.), a rotating structure balancing device 76 and one or more additional powerplant components 78-80. The powerplant rotating structure 70, of course, may also include one or more additional powerplant components other than those shown in FIG. 2. For example, where the powerplant rotating structure 70 is configured as one of the rotating structures 50, 54, the powerplant rotating structure 70 also includes one or more engine rotors (e.g., 40 and 43, 41 and 42 as shown in FIG. 1).

The balancing device 76 is configured to rotationally balance the powerplant rotating structure 70 about the structure axis 72 while, for example, the powerplant rotating structure 70 remains partially or completely installed within the aircraft powerplant 20 and its gas turbine engine 26. The balancing device 76 of FIG. 2 includes a (e.g., multi-piece) device housing 82 and a plurality of balancing masses 84; see also FIG. 3.

The device housing 82 extends axially along the structure axis 72 between and to opposing axial sides 86 and 88 of the device housing 82. The device housing 82 extends radially from a radial inner end 90 of the device housing 82 to a radial outer end 92 of the device housing 82. The device housing 82 of FIG. 2 includes an axial first sidewall 94, an axial second sidewall 96, a radial outer endwall 98, a radial inner mass mount 100 (e.g., an apertured mounting bushing) and a housing channel 102; e.g., an internal cavity or other volume. The device housing 82 and each of its members 94, 96, 98, 100 and 102 extend circumferentially about (e.g., completely around) the structure axis 72. The device housing 82 and each of its members 94, 96, 98, 100 and 102 may thereby have a full-hoop geometry. The first sidewall 94, the second sidewall 96 and the housing channel 102 of FIG. 2, for example, each have an annular geometry, and the outer endwall 98 and the mass mount 100 each have a tubular geometry.

The first sidewall 94 is disposed at (e.g., on, adjacent or proximate) the housing first side 86. The first sidewall 94 of FIG. 2, for example, extends axially along the structure axis 72 from the housing first side 86 to an axial second side 104 of the first sidewall 94; e.g., an axial first interior side of the device housing 82. The first sidewall 94 projects radially out from the housing inner end 90 to a first section 106 of the outer endwall 98 at the housing outer end 92. The first sidewall 94 is also connected to (e.g., formed integral with or otherwise attached to) the endwall first section 106.

The second sidewall 96 is disposed at the housing second side 88. The second sidewall 96 of FIG. 2, for example, extends axially along the structure axis 72 from the housing second side 88 to an axial first side 108 of the second sidewall 96; e.g., an axial second interior side of the device housing 82. The second sidewall 96 projects radially out from the housing inner end 90 to a second section 110 of the outer endwall 98 at the housing outer end 92. The second sidewall 96 is also connected to (e.g., formed integral with or otherwise attached to) the endwall second section 110.

The outer endwall 98 is collectively formed by the endwall first section 106 and the endwall second section 110 axially along the structure axis 72 between the housing first side 86 and the housing second side 88. The outer endwall 98 of FIG. 2 thereby extends axially along the structure axis 72 from the housing first side 86 to the housing second side 88. The outer endwall 98 is disposed at the housing outer end 92. The outer endwall 98 of FIG. 2, for example, extends radially (e.g., inwards towards the structure axis 72) from the housing outer end 92 to a radial inner side 112 of the outer endwall 98 and its members 106 and 110; e.g., a radial outer interior side of the device housing 82. Here, the outer endwall 98 and each of its members 106 and 110 is spaced radially outboard from the mass mount 100. The outer endwall 98 and each of its members 106 and 110 further axially overlap and circumscribe the mass mount 100.

The endwall first section 106 is discrete from the endwall second section 110. More particularly, the endwall first section 106 is axially spaced apart from the endwall second section 110. With this arrangement, the outer endwall 98 is configured with an endwall slot 114. This endwall slot 114 extends axially within the outer endwall 98 between and to axial distal ends of the endwall sections 106 and 110. The endwall slot 114 extends radially through the outer endwall 98 from the endwall inner side 112 to the housing outer end 92. The endwall slot 114 extends within the outer endwall 98 circumferentially about (e.g., completely around) the structure axis 72. The endwall slot 114 of FIG. 2 may thereby have a full-hoop (e.g., annular) geometry.

Figure 3:
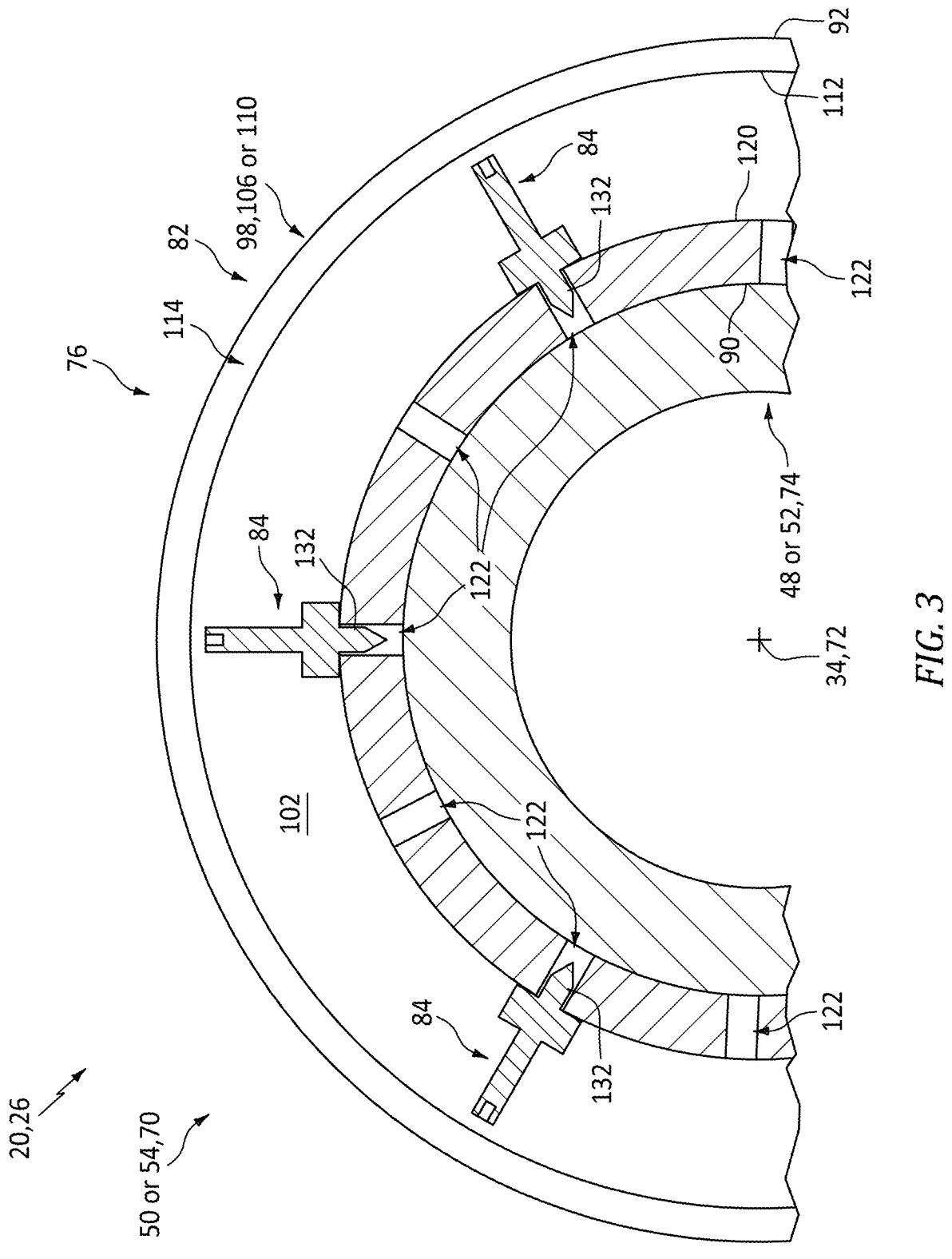
FIG. 3 is a cross-sectional illustration of a portion of the powerplant rotating structure.

The mass mount 100 extends axially along the structure axis 72 between and to opposing axial ends 116 and 118 of the mass mount 100. The mass mount 100 is disposed at the housing inner end 90. The mass mount 100 of FIG. 2, for example, extends radially from the housing inner end 90 to a radial outer side 120 of the mass mount 100; e.g., a radial inner interior side of the device housing 82. The mass mount 100 includes one or more mounting apertures 122; e.g., tapped holes. Referring to FIG. 3, the mounting apertures 122 are arranged circumferentially about the structure axis 72 in an annular array; e.g., a circular array. Within the array, the mounting apertures 122 may (or may not) be equispaced circumferentially about the structure axis 72. The mounting apertures 122 may also be axially aligned along the structure axis 72. Each mounting aperture 122 of FIG. 2, for example, may be located at a common intermediate location (e.g., an axial center) between the mount first end 116 and the mount second end 118. Each of the mounting apertures 122 may extend radially through the mass mount 100 between and to the mount outer side 120 and the housing inner end 90. Alternatively, each mounting aperture 122 may project partially radially into the mass mount 100 from the mount outer side 120.

The mass mount 100 is disposed axially between the first sidewall 94 and the second sidewall 96 at the housing inner end 90. The mass mount 100 and its mount first end 116 of FIG. 2 may axially contact, abut axially against and/or otherwise axially engage the first sidewall 94 and its first sidewall second side 104. The mass mount 100 and its mount second end 118 of FIG. 2 may axially contact, abut axially against and/or otherwise axially engage the first sidewall 94 and its second sidewall first side 108. With this arrangement, the mass mount 100 may be axially clamped between the first sidewall 94 and the second sidewall 96.

The housing channel 102 of FIG. 2 extends axially along the structure axis 72 within the device housing 82 between the first sidewall 94 and the second sidewall 96. The first sidewall 94 thereby forms an axial first peripheral boundary of the housing channel 102, and the second sidewall 96 forms an axial second peripheral boundary of the housing channel 102. The housing channel 102 of FIG. 2 extends radially within the device housing 82 between the mass mount 100 and the outer endwall 98. The mass mount 100 thereby forms a radial inner peripheral boundary of the housing channel 102, and the outer endwall 98 forms a radial outer peripheral boundary of the housing channel 102.

Each of the balancing masses 84 extends longitudinally along a longitudinal centerline 124 of the respective balancing mass 84 (e.g., radially relative to the structure axis 72) form a radial inner end 126 of the respective balancing mass 84 to a radial outer end 128 of the respective balancing mass 84. Each balancing mass 84 includes a mass body 130, a mass shank 132 and a mass engagement feature 134.

The mass body 130 of FIG. 2 is disposed radially between the mass shank 132 and the mass engagement feature 134. The mass body 130 extends longitudinally along its mass centerline 124 (e.g., radially relative to the structure axis 72) from a radial inner end of the mass body 130 to a radial outer end of the mass body 130. This mass body 130 may be a solid portion of the respective balancing mass 84. The mass body 130 of FIG. 2, for example, is configured as a solid cylindrical puck, which may form an annular inner shoulder adjacent the mass shank 132 and/or an annular outer shoulder adjacent the mass engagement feature 134.

Figure 4:
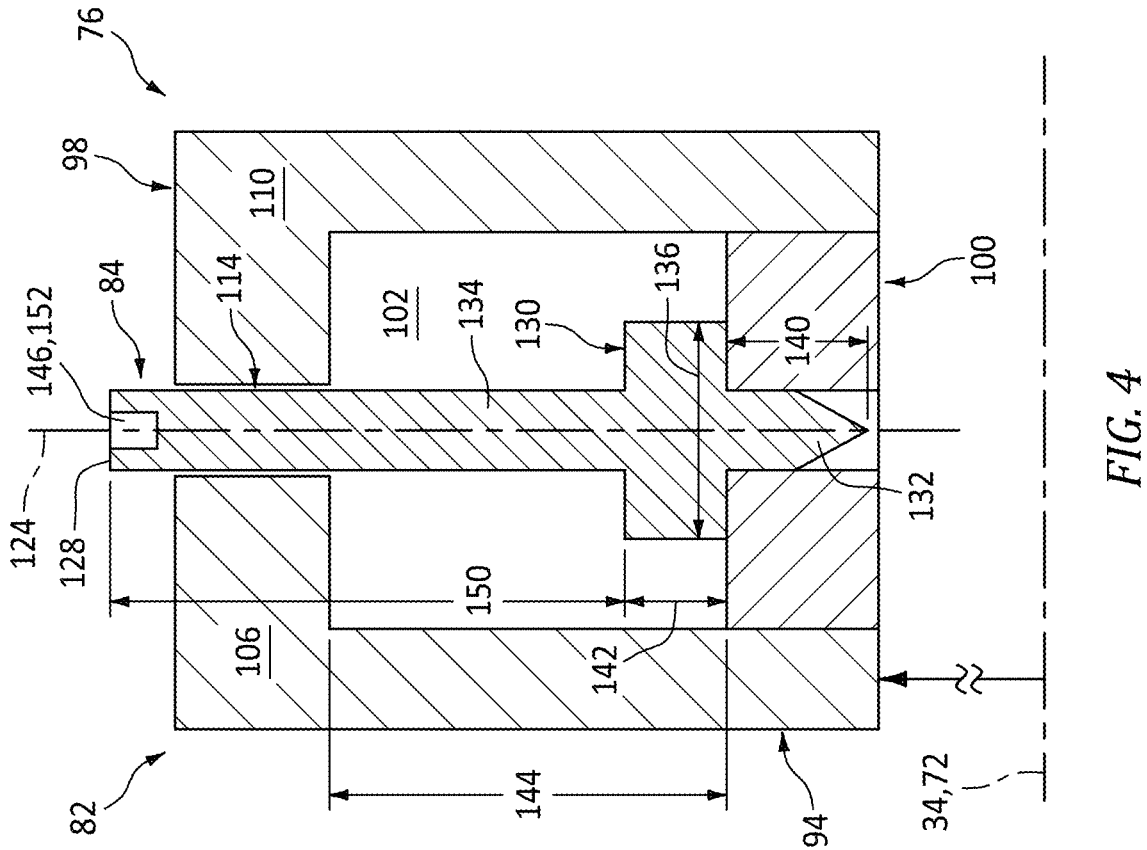
FIG. 4 is a partial sectional illustration of a balancing device with another balancing mass arrangement.

The mass shank 132 is connected to (e.g., formed integral with or otherwise attached to) the mass body 130. The mass shank 132 is disposed at the mass inner end 126. The mass shank 132 of FIG. 2, for example, projects longitudinally along its mass centerline 124 (e.g., radially relative to the structure axis 72) out from the mass body 130 and its body inner end to a longitudinal distal end of the mass shank 132 at the mass inner end 126. At least a radial outer portion (or an entirety) of the mass shank 132 is threaded. A radial inner portion of the mass shank 132 at its shank distal end may be tapered (e.g., pointed, cased, etc.) to facilitate mating with a respective one of the mounting apertures 122. Here, an axial width 136 of the mass body 130 is (e.g., at least 1.5×, 2×, 3× or 4×) larger than an axial width 138 of the mass shank 132. A radial height 140 of the mass shank 132 (see also FIG. 4) may be equal to or less than a radial thickness of the mass mount 100. In addition, a sum of the shank height 140 and a radial thickness 142 of the mass body 130 is less than a radial distance 144 from the mass mount 100 and its mount outer side 120 to the outer endwall 98 and its endwall inner side 112; e.g., a radial height of the housing channel 102.

The mass engagement feature 134 is connected to (e.g., formed integral with or otherwise attached to) the mass body 130. The mass engagement feature 134 is disposed at the mass outer end 128. The mass engagement feature 134 of FIG. 2, for example, projects longitudinally along its mass centerline 124 (e.g., radially relative to the structure axis 72) out from the mass body 130 and its body outer end to a longitudinal distal end of the mass engagement feature 134 at the mass outer end 128. In particular, the mass engagement feature 134 of FIG. 2 is configured as a longitudinally elongated protrusion (e.g., an unthreaded cylindrical shaft) with a wrenching feature 146. Here, the body width 136 may be (e.g., at least 1.5×, 2×, 3× or 4×) larger than an axial width 148 of the mass engagement feature 134. In addition, a sum of the body thickness 142 and a radial height 150 of the mass engagement feature 134 may be less than the inter-mountendwall distance 144 such that the mass outer end 128 may be radially inboard of the outer endwall 98 when the respective balancing mass 84 is attached to the mass mount 100 as described below. However, it is contemplated the sum of the body thickness 142 and the engagement feature height 150 may alternatively be greater than the inter-mount-endwall distance 144 such that the mass engagement feature 134 is mated with (and may project radially through) the endwall slot 114 when the respective balancing mass 84 is attached to the mass mount 100; e.g., see FIG. 4.

Figure 5:
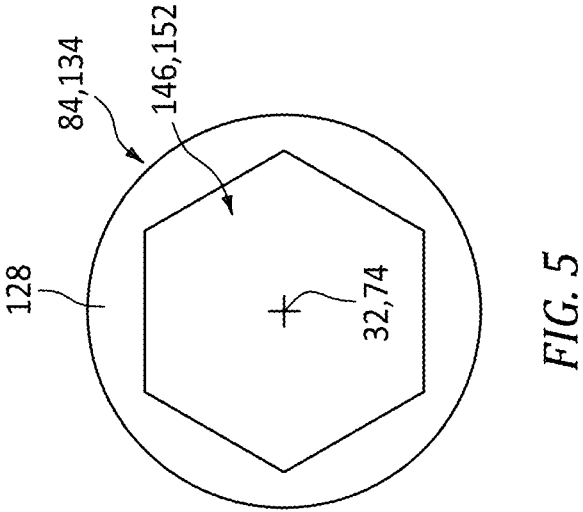
FIG. 5 is an end view illustration of a balancing mass at a wrenching feature.

The wrenching feature 146 of FIG. 2 is disposed at the mass outer end 128/the distal end of the mass engagement feature 134. This wrenching feature 146 may be configured as a recess 152 in the mass engagement feature 134. The recess 152 of FIG. 2, for example, projects partial longitu-dinally (e.g., radially inward) into the mass engagement feature 134 from the mass outer end 128 to an end of the recess 152. The recess 152 also extends laterally within the mass engagement feature 134. Referring to FIG. 5, the recess 152 may be configured with a polygonal cross-sectional geometry when viewed, for example, in a reference plane perpendicular to the respective mass centerline 124. Examples of the polygonal cross-sectional geometry include, but are not limited to, a square geometry and a hexagonal geometry. With such an arrangement, a tool may be mated with the wrenching feature 146 for turning the respective balancing mass 84 about its mass centerline 124. The mass engagement feature 134 and, more generally, the entire balancing mass 84 may be constructed from or otherwise include a magnetic material such that the tool may magnetically hold the respective balancing mass 84 as described below.

Referring to FIG. 2, each of the balancing masses 84 is radially and axially captured within the device housing 82 and mounted to the mass mount 100. Each mass shank 132 of FIG. 2, for example, is threaded into a respective one of the mounting apertures 122. Note, referring to FIG. 3, a quantity of the balancing masses 84 is less than a quantity of the mounting apertures 122. Thus, even when all of the balancing masses 84 are mounted to the mass mount 100, one or more of the mounting apertures 122 remain open; e.g., unfilled. For example, there may be at least one and one-half times (1.5×) or two times (2×) the quantity of the mounting apertures 122 as the quantity of the balancing masses 84. The present disclosure, however, is not limited to such an exemplary ratio.

When each balancing mass 84 is mounted to the mass mount 100, the mass body 130 and its body inner end may axially contact, abut axially against and/or otherwise axially engage the mass mount 100 and its mount outer side 120. The mass mount 100 is disposed within the housing channel 102—radially outboard of the mass mount 100 and radially inboard of the outer endwall 98 and its members 106 and 110. Each endwall section 106, 110 of FIG. 2 is also disposed radially outboard of, axially overlaps and circum-ferentially overlaps the mass mount 100. The mass engage-ment feature 134 is also disposed within the housing channel 102. In the arrangement of FIG. 2, the entire mass engage-ment feature 134 is disposed within the housing channel 102 such that its distal end is radially inboard of the outer endwall 98. However, the mass engagement feature 134 is axially aligned with the endwall slot 114 such that there is a direct (e.g., straight-line) line of sight radially through the endwall slot 114 to the wrenching feature 146 of each balancing mass 84.

The balancing device 76 and the one or more additional powerplant components 78-80 may be mounted onto the powerplant shaft 74. Each of the components 78-80, 94, 96 and 100 of FIG. 2, for example, is mated with the powerplant shaft 74. The powerplant shaft 74 projects axially through a center bore of each component 78-80, 94, 96 and 100 such that the respective component 78-80, 94, 96 and 100 axially overlaps and circumscribes the powerplant shaft 74. The components 78, 94, 100, 96, 79 and 80 may be sequentially arranged axially along the powerplant shaft 74, and clamped axially between two elements 154 and 156. One of these elements (e.g., 154) may be a shoulder on the powerplant shaft 74. Another one of these elements (e.g., 156) may be a stack nut threaded onto the powerplant shaft 74. With this arrangement, the components 78, 94, 100, 96, 79 and 80 may be axially clamped in a common (the same) axial stack to attach (e.g., rotationally and axially fix) each of the com-ponents 78, 94, 100, 96, 79 and 80 to the powerplant shaft 74.

Within the stack, the first component 78 axially contact, abuts against and/or otherwise axially engages the first sidewall 94 at the housing first side 86. The second com-ponent 79 axially contact, abuts against and/or otherwise axially engages the second sidewall 96 at the housing second side 88. With this arrangement, the mass mount 100 may be axially clamped between the first sidewall 94 and the second sidewall 96 as described above.

In some embodiments, referring to FIG. 3, each of the balancing masses 84 may be configured with a common weight. Each of the balancing masses 84 of FIG. 3, for example, is provided with a common configuration; e.g., an identical weight, geometry, etc. The present disclosure, however, is not limited to such exemplary embodiments. For example, in other embodiments, one or more of the balanc-ing masses 84 may be provided with a different configura-tion than one or more other balancing masses 84. A first set of the balancing masses, for example, may have a first head size with a first weight. A second set of the balancing masses may have a second head size with a second weight that is different than the first weight. The first balancing masses may thereby be heavier than the second balancing masses.

Figure 6:
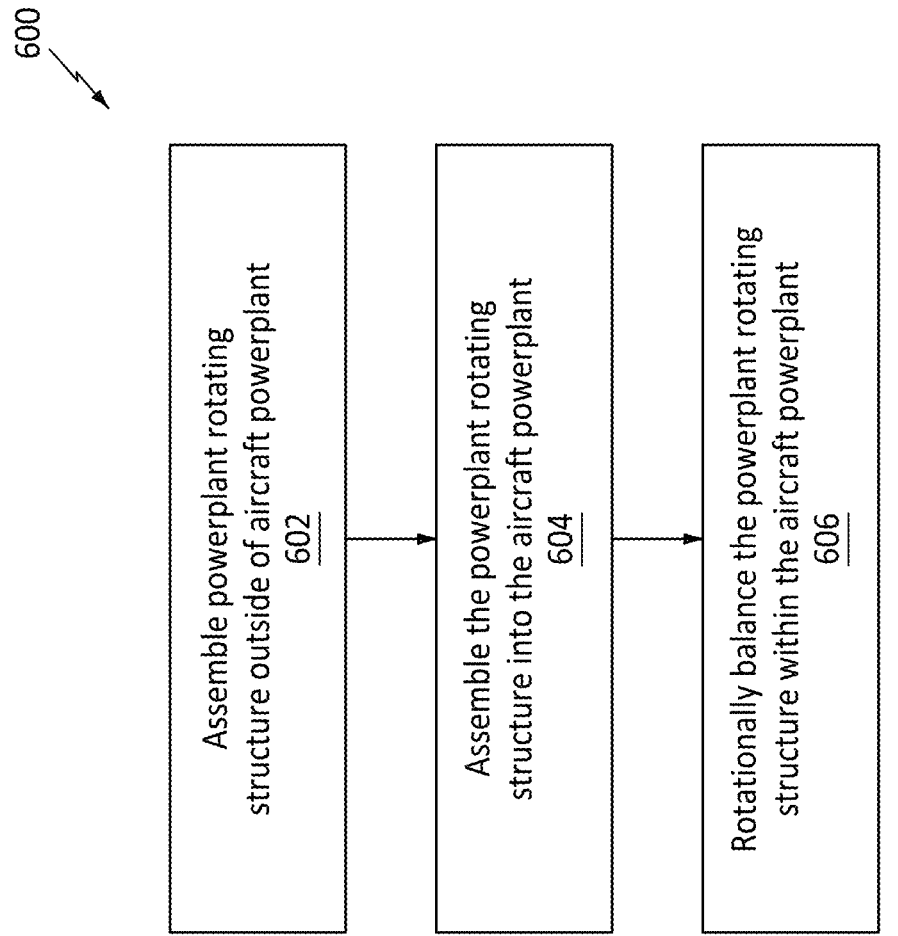
FIG. 6 is a flow diagram of a method for balancing a rotating structure of an aircraft powerplant.

FIG. 6 is a flow diagram of a method 600 for (e.g., in situ) balancing a rotating structure of an aircraft powerplant. For ease of description, this balancing method 600 is described below with respect to the powerplant rotating structure 70 shown in FIGS. 2 and 3. The present disclosure, however, is not limited to such an exemplary powerplant rotating struc-ture nor to use of the exemplary balancing device described herein.

In step 602, the powerplant rotating structure 70 is assembled outside of the aircraft powerplant 20 and its gas turbine engine 26. During this assembly, the powerplant rotating structure 70 may be rotationally balanced on a balancing rig using various known balancing techniques.

In step 604, the powerplant rotating structure 70 is assembled into the aircraft powerplant 20 and its gas turbine engine 26. The previously assembled and balanced power-plant rotating structure 70, for example, may be partially or completely disassembled and then reassembled into the aircraft powerplant 20 and its gas turbine engine 26. During this reassembly process, slight variations due to manufac-turing tolerances, etc. may lead to a slight misbalance of the powerplant rotating structure 70.

Figures 7A, 7B, 7C:
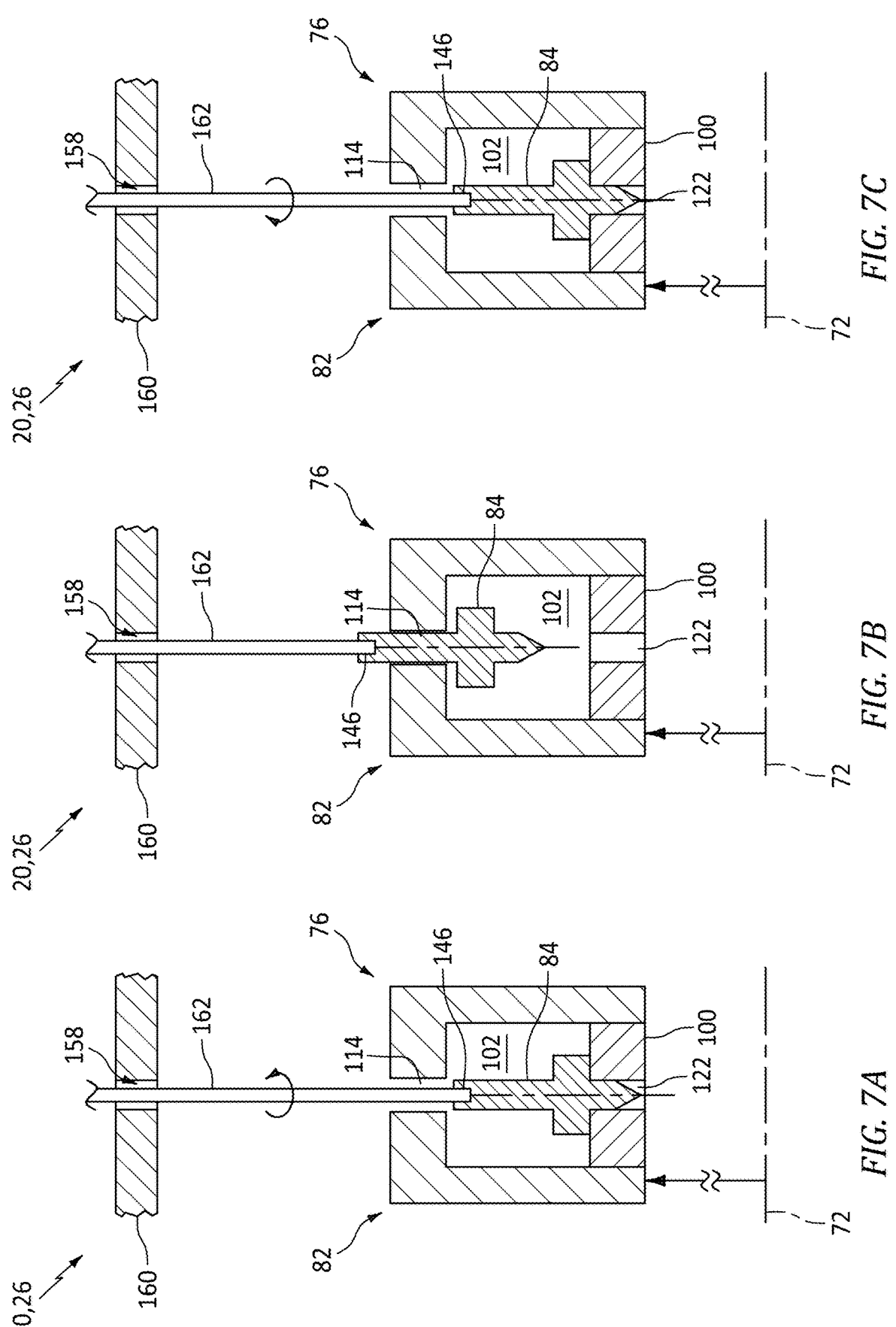
FIGS. 7A-C are partial sectional illustrations of the balancing device during a balancing operation.

In step 606, the powerplant rotating structure 70 is rota-tionally balanced while partially or completely assembled within the aircraft powerplant 20 and its gas turbine engine 26. For example, referring to FIGS. 2, 3 and 7A, the powerplant rotating structure 70 may be rotated (e.g., manu-ally by hand via an accessory gearbox, a tower shaft, etc.)

such that a respective one of the balancing masses 84 is circumferentially aligned with an access port 158 in a stationary structure 160 of the aircraft powerplant 20; e.g., an engine case, a frame, etc. This stationary structure 160 is disposed radially outboard of, axially overlaps and circumscribes at least a portion of the powerplant rotating structure 70 with the balancing device 76. Once the access port 158 is aligned with the respective balancing mass 84 (e.g., through the endwall slot 114), a tool 162 may be passed through the access port 158 and mated with the respective wrenching feature 146. The tool 162 may be twisted in a first direction to rotate the respective balancing mass 84 about its mass centerline 124 and unthread the respective mass shank 132 out of the respective mounting aperture 122. A tip of the tool 162 may be magnetic so as to hold the mass engagement feature 134. Referring to FIG. 7B, the tool 162 may be translated radially outward to (e.g., slightly space) the respective balancing mass 84 radially outboard from the mass mount 100. The powerplant rotating structure 70 may then be rotated again such that the respective balancing mass 84 is circumferentially aligned with another one of the mounting apertures 122. Referring to FIG. 7C, the foregoing process may be reversed to thread the mass shank 132 into this new mounting aperture 122. Using this technique with a single one of the balancing masses 84, some of the balancing masses 84 or all of the balancing masses 84, a technician may rotationally balance the powerplant rotating structure 70 from outside of the stationary structure 160 while the powerplant rotating structure 70 remains installed within the aircraft powerplant 20 and its gas turbine engine 26. By contrast, using traditional balancing techniques, the powerplant rotating structure 70 would need to be removed from the aircraft powerplant 20 and rebalanced on the balancing rig.

Figure 8:
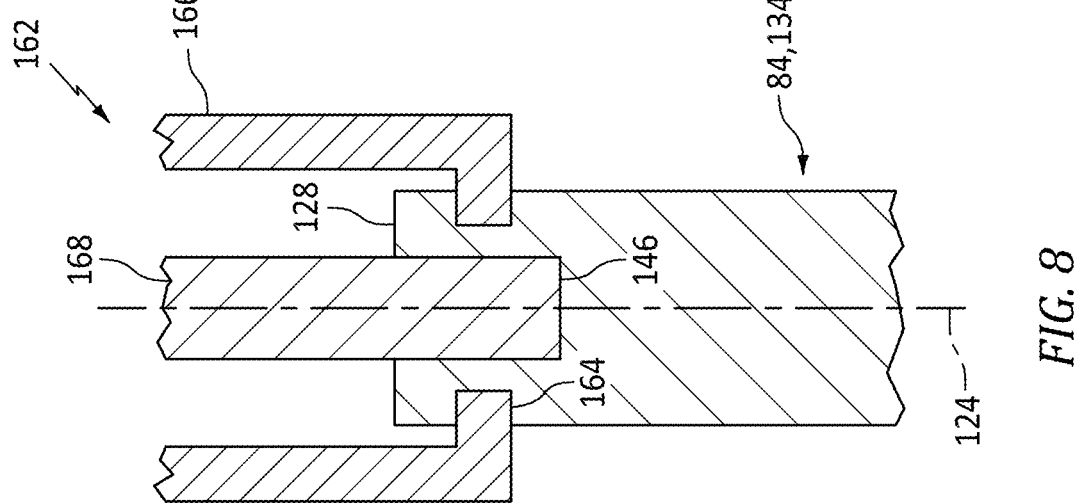
FIG. 8 is a partial sectional illustration of another balancing mass engaged by a tool.

In some embodiments, referring to FIGS. 7A-C, the tool 162 may hold the respective balancing mass 84 via, for example, a magnetic coupling. The present disclosure, however, is not limited to such an exemplary coupling technique between the tool 162 and the respective balancing mass 84. For example in other embodiments, referring to FIG. 8, the mass engagement feature 134 may also include a grip 164 at the mass outer end 128. Examples of the grip 164 include, but are not limited to, an annular notch or groove, an annular rim, or the like. With such an arrangement, the tool 162 may include a spreadable (e.g., splaying) gripping device 166 which mated with the grip 164 and a turning device 168 which mates with the wrenching feature 146.

While each of the balancing masses 84 is described above as being removably mounted to the device housing 82 through a respective threaded interface, the balancing device 76 of the present disclosure is not limited to such an exemplary arrangement. For example, referring to FIG. 9, it is contemplated each balancing mass 84 may alternatively be tangentially mounted to the device housing 82 through a clamped interface and/or a detent coupling. Each balancing mass 84 of FIG. 9, for example, includes a lug 170 (e.g., a slide) as its mass body 130 and a pin 172 as its mass engagement feature 134. Each balancing mass 84 of FIG. 9 also includes a spring element 174 such as a coil spring, a bellows spring, etc.

Figure 9:
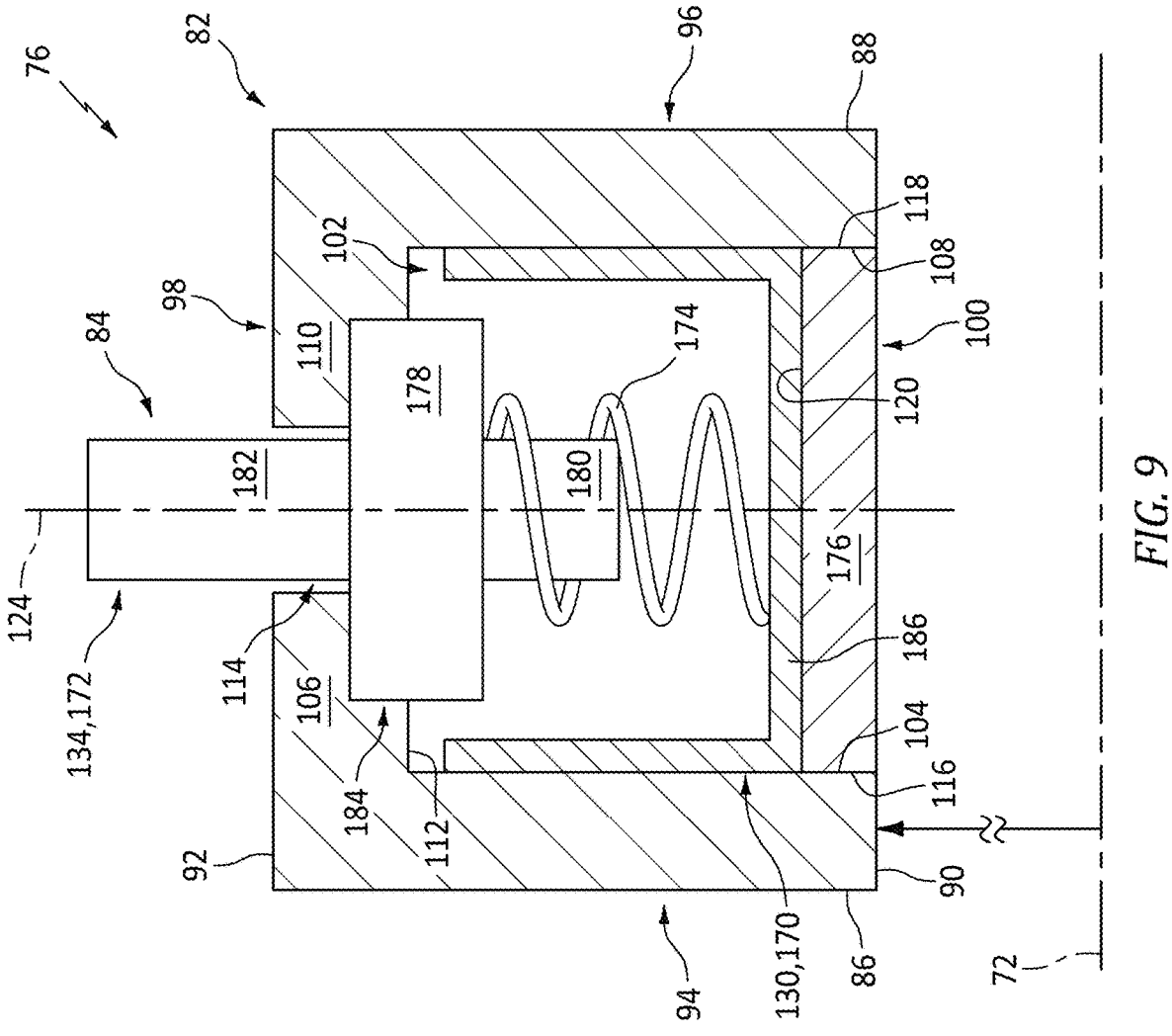
FIG. 9 is a partial sectional illustration of the balancing device with another balancing mass arrangement.

The lug 170 is disposed within the housing channel 102. The lug 170 is disposed radially outboard of and radially contacts, abuts radially against and/or otherwise radially engages the housing component 100 and its outer side 120. With this arrangement, the lug 170 is operable to slide circumferentially along the housing component 100 when adjusting a position of the respective balancing mass 84; see FIGS. 10A-E. Here, the housing component 100 of FIG. 9 is configured as a bushing 176 with a smooth (e.g., axially and/or circumferentially) uninterrupted surface at its outer side 120 to facilitate balancing mass adjustment.

The pin 172 includes a shoulder 178, an inner shaft 180 and an outer shaft 182. The shoulder 178 is connected to (e.g., formed integral with or otherwise attached to) the inner shaft 180 and the outer shaft 182. The shoulder 178 is configured to mate with (e.g., be received in) any one of a plurality of detents 184 (e.g., depressions, notches, etc.) formed in the outer endwall 98 at its endwall inner side 112. Briefly, these detents 184 are arranged and may (or may not) be equispaced circumferentially about the structure axis 72 in an annular array; e.g., a circular array. The inner shaft 180 projects radially inward from the shoulder 178 to a radial inner end of the pin 172. The outer shaft 182 projects radially outward from the shoulder 178 to a radial outer end of the pin 172. This outer shaft 182 is disposed in and may project radially through the endwall slot 114 to its pin outer end.

The spring element 174 is coupled to the lug 170 and mounted onto the pin 172 and its inner shaft 180. The inner shaft 180 of FIG. 9, for example, projects radially into an inner bore region of the spring element 174 such that the spring element 174 extends longitudinally along and circumscribes the inner shaft 180. Here, the spring element 174 is disposed in a channel of the lug 170 and is compressed between an inner wall 186 of the lug 170 and the shoulder 178. The spring element 174 may thereby press the inner wall 186 of the lug 170 against the bushing 176. The spring element 174 may also press the shoulder 178 against the outer endwall 98 and its members 106 and 110. The spring element 174 may thereby lock the shoulder 178 in a respective detent 184 when aligned.

To adjust a circumferential position of a respective balancing mass 84 relative to the device housing 82, a tool may be used to push the pin 172 radially inwards towards the bushing 176 such that the shoulder 178 is out of the respective detent 184 and radially below the endwall inner side 112. The powerplant rotating structure 70 may then be rotated such that the respective balancing mass 84 and its lug 170 slide along the bushing 176 and move into alignment with another one of the detents 184. The tool may then be retracted, and the spring element 174 may push the shoulder 178 into the new respective detent 184. A sequence of this balancing mass adjustment is shown, for example, in FIGS. 10A-E.

Figures 10A, 10B:
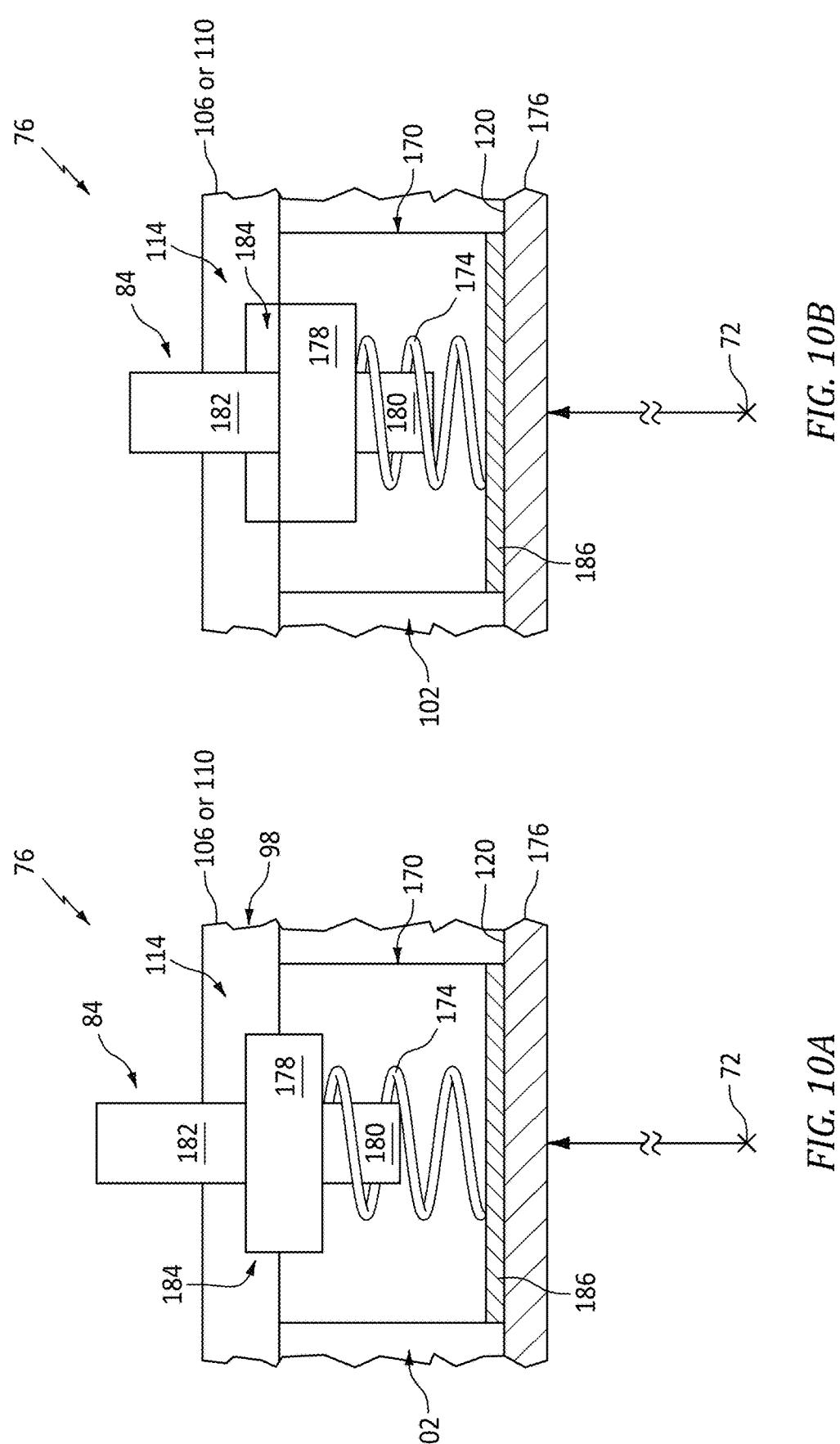
FIGS. 10A-E are partial cross-sectional illustrations of the balancing device of FIG. 9 during a balancing operation.
Figures 10C, 10D:
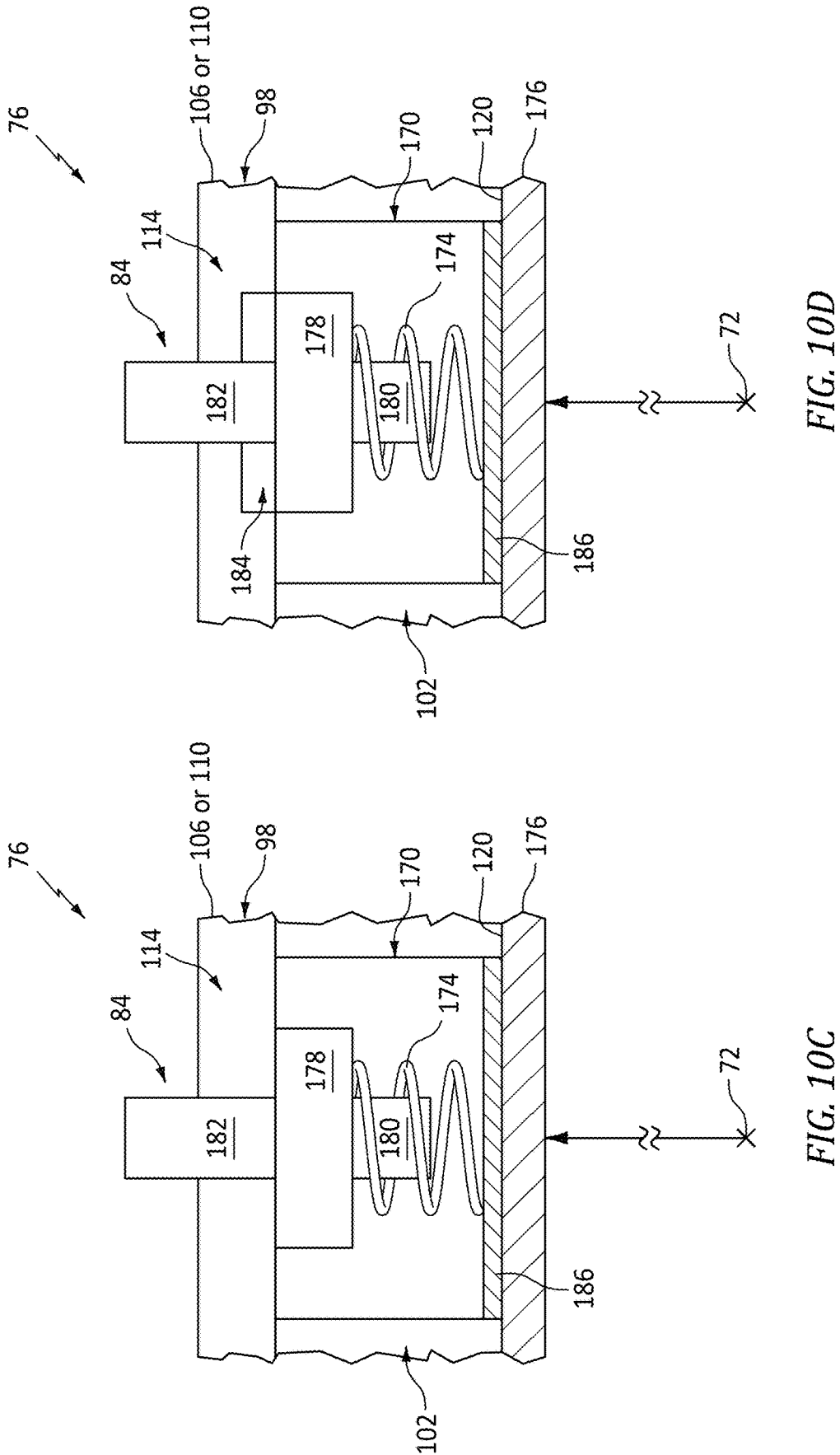
Figure 10E:
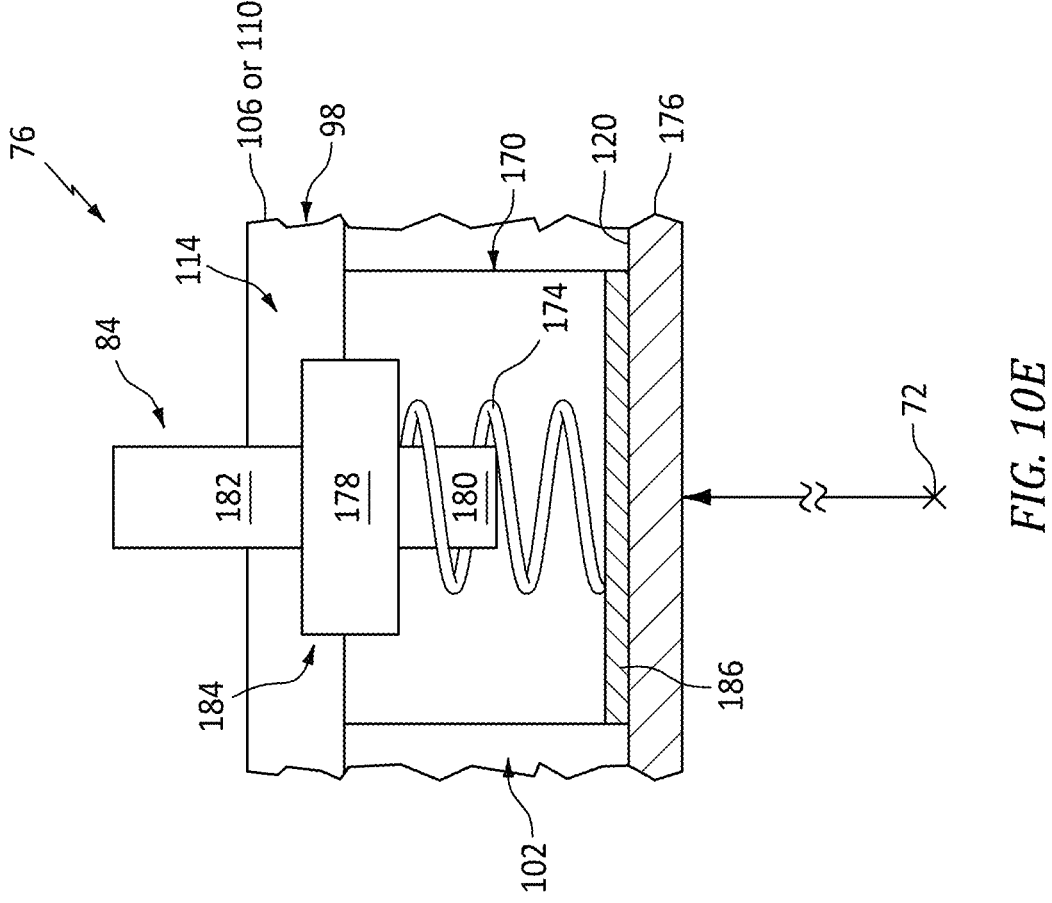
Figure 11:
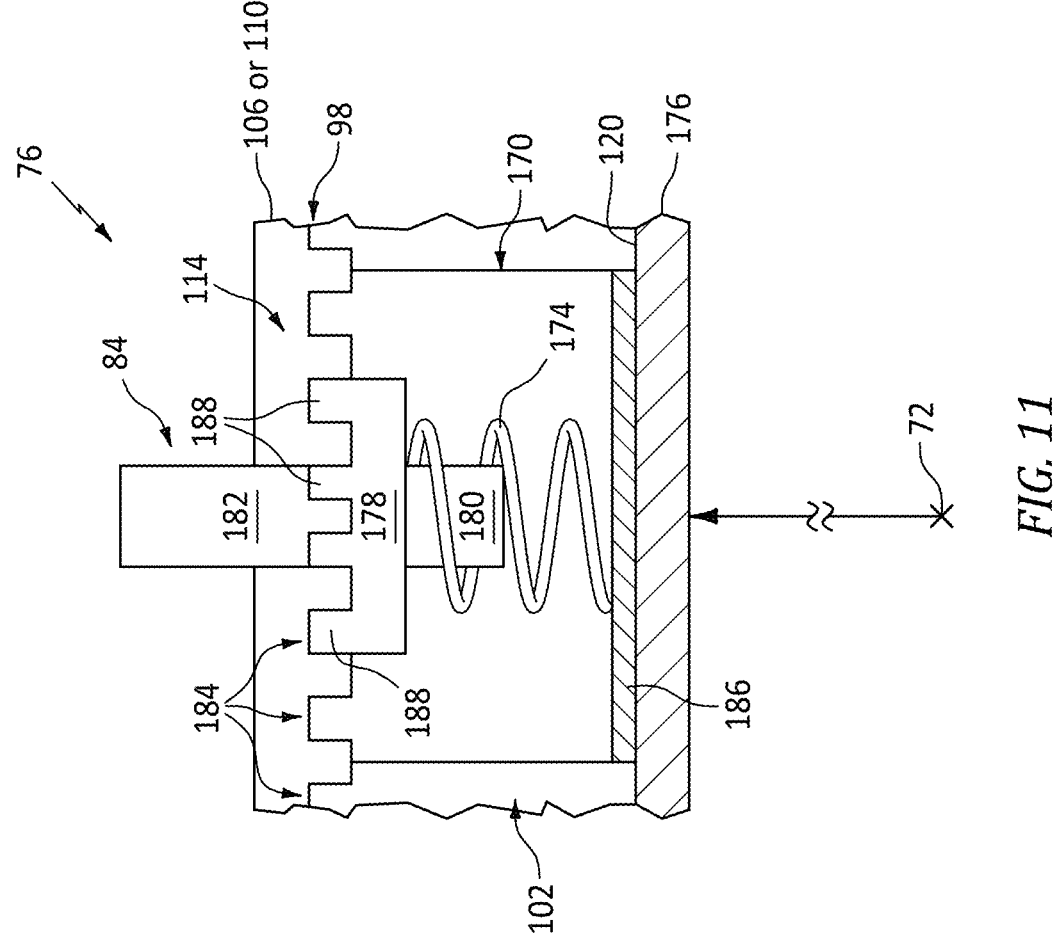
FIG. 11 is a partial sectional illustration of the balancing device with another balancing mass arrangement.

In some embodiments, referring to FIG. 10A, an entire footprint of the shoulder 178 may be received within the respective detent 184. In other embodiments, referring to FIG. 11, the shoulder 178 may include one or more axially extending teeth 188. Each of these teeth 188 may be received within a respective detent 184. This arrangement may facilitate finer circumferential adjustments of the respective balancing mass 84 compared to the arrangement of FIG. 10A.

While radial access to each balancing mass 84 is described above as extending along a trajectory which is perpendicular to the structure axis 72 (e.g., see FIGS. 7A-C), the present disclosure is not limited thereto. The radial access, for example, may alternatively extend along a trajectory which is offset from the structure axis 72 by an offset angle less than ninety degrees (90°) and greater than zero degrees (0°).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft powerplant, comprising:
a rotating structure including a balancing device and a bladed rotor, the balancing device configured to rotationally balance the rotating structure about a rotational axis, and the balancing device including a housing and a plurality of balancing masses;
the housing including a first sidewall, a second sidewall, an outer endwall, an annular channel and an annular slot, the first sidewall and the second sidewall each projecting radially out away from the rotational axis to the outer endwall, the outer endwall circumscribing the annular channel, the annular channel extending axially within the housing between the first sidewall and the second sidewall, and the annular slot extending radially through the outer endwall to the annular channel; and
each of the plurality of balancing masses including a mass body and an engagement feature, each mass body captured within the annular channel, each engagement feature axially aligned with the annular slot, and each engagement feature configured to be engaged by a tool from outside of the housing to adjust a circumferential position of the respective mass body about the rotational axis.

2. The apparatus of claim 1, wherein each mass body has an axial width larger than an axial width of the annular slot.

3. The apparatus of claim 1, wherein the engagement feature of a first of the plurality of balancing masses comprises a protrusion that projects radially from the respective mass body to an outer protrusion distal end, each protrusion is axially aligned with the annular slot, and an axial width of each protrusion is less than the axial width of the annular slot.

4. The apparatus of claim 1, wherein the engagement feature of a first of the plurality of balancing masses comprises a protrusion that projects radially from the respective mass body, into or through the annular slot, to an outer protrusion distal end.

5. The apparatus of claim 1, wherein the engagement feature of a first of the plurality of balancing masses comprises a wrenching feature.

6. The apparatus of claim 1, wherein
the housing further includes a mount radially inboard of the annular channel, the mount comprising a plurality of mounting apertures arranged circumferentially about the rotational axis;
each of the plurality of balancing masses further including a shank threaded into a respective one of the plurality of mounting apertures.

7. The apparatus of claim 6, wherein the shank of each of the plurality of balancing masses is configured to be rotated by the tool to thread into or out of a select one of the plurality of mounting apertures when rotationally balancing the rotating structure about the rotational axis.

8. The apparatus of claim 6, wherein a radial distance from the mount to the outer endwall is greater than a sum of a radial height of a respective one of the shanks and a radial thickness of a respective one of the mass bodies.

9. The apparatus of claim 6, wherein a radial distance from the mount to the outer endwall is greater than a sum of a radial height of a respective one of the engagement features and a radial thickness of a respective one of the mass bodies.

10. The apparatus of claim 6, wherein the plurality of mounting apertures are equispaced circumferentially about the rotational axis.

11. The apparatus of claim 6, wherein the mount is axially clamped between the first sidewall and the second sidewall.

12. The apparatus of claim 6, wherein a quantity of the plurality of mounting apertures is greater than a quantity of the plurality of balancing masses.

13. The apparatus of claim 1, wherein each mass body comprises a lug disposed and circumferentially slidable within the annular channel, each engagement feature comprises a pin with a shoulder, and each of the plurality of balancing masses further includes a spring element compressed between the respective lug and the respective shoulder.

14. The apparatus of claim 13, wherein the outer endwall is configured with a plurality of detents arranged circumferentially about the rotational axis, and at least a portion of each shoulder is configured to mate with a respective one or more of the plurality of detents to fix a position of the respective lug within the annular channel.

15. The apparatus of claim 14, wherein the plurality of detents are equispaced circumferentially about the rotational axis.

16. The apparatus of claim 13, wherein the housing further includes a bushing radially inboard of the annular channel and axially clamped between the first sidewall and the second sidewall, the bushing is radially engaged by the lug of each of the plurality of balancing masses.

17. The apparatus of claim 1, wherein
the rotating structure further includes a shaft and a plurality of components; and
the housing and the plurality of components are axially clamped in a common axial stack to attach the housing and the plurality of components to the shaft.

18. The apparatus of claim 1, further comprising a compressor section, a combustor section, a turbine section and a flowpath extending through the compressor section, the combustor section and the turbine section, wherein the bladed rotor is disposed in the turbine section or the compressor section.

19. An apparatus for an aircraft powerplant, comprising:
a rotating structure including a balancing device and a bladed rotor, the balancing device configured to rotationally balance the rotating structure about a rotational axis, and the balancing device including a housing and a plurality of balancing masses;
the housing including a first sidewall, a second sidewall, an outer endwall, a mount, an annular channel and an annular slot, the first sidewall and the second sidewall each projecting radially out away from the rotational axis to the outer endwall, the outer endwall circumscribing the mount, the mount including a plurality of mounting apertures arranged circumferentially about the rotational axis, the annular channel extending axially within the housing between the first sidewall and the second sidewall, the annular channel extending radially within the housing between the outer endwall and the mount, and the annular slot extending radially through the outer endwall to the annular channel; and
each of the plurality of balancing masses including a mass body, an engagement feature and a shank, each mass body captured within the annular channel, each engage-
ment feature axially aligned with the annular slot, and
each shank threaded into a respective one of the plu-
rality of mounting apertures.

20. An apparatus for an aircraft powerplant, comprising:
a rotating structure including a balancing device and a
bladed rotor, the balancing device configured to rota-
tionally balance the rotating structure about a rotational
axis, and the balancing device including a housing and
a plurality of balancing masses;
the housing including a first sidewall, a second sidewall,
an outer endwall, a bushing, an annular channel and an
annular slot, the first sidewall and the second sidewall
each projecting radially out away from the rotational
axis to the outer endwall, the outer endwall circum-
scribing the bushing, the annular channel extending
axially within the housing between the first sidewall
and the second sidewall, the annular channel extending
radially within the housing between the outer endwall
and the bushing, and the annular slot extending radially
through the outer endwall to the annular channel; and
each of the plurality of balancing masses including a lug,
a spring element and a pin with a shoulder, each lug
disposed within the annular channel and circumferen-
tially slidable along the bushing, and each spring ele-
ment compressed between the respective lug and the
respective shoulder.

\* \* \* \* \*